No. 807,358. PATENTED DEC. 12, 1905.
F. J. COOK.
CORN HARVESTER.
APPLICATION FILED DEC. 15, 1904.

3 SHEETS—SHEET 1.

Witnesses
C. Munter
C. H. Griesbauer.

Inventor
F. J. Cook
by H. B. Willson
Attorney

No. 807,358. PATENTED DEC. 12, 1905.
F. J. COOK.
CORN HARVESTER.
APPLICATION FILED DEC. 15, 1904.

3 SHEETS—SHEET 3.

Witnesses
C. Munk Jr.
C. H. Griesbauer.

Inventor
F. J. Cook
by H. B. Wilson
Attorney

UNITED STATES PATENT OFFICE.

FREDERICK J. COOK, OF HEYWORTH, ILLINOIS.

CORN-HARVESTER.

No. 807,358.     Specification of Letters Patent.     Patented Dec. 12, 1905.

Application filed December 15, 1904. Serial No. 236,972.

*To all whom it may concern:*

Be it known that I, FREDERICK J. COOK, a citizen of the United States, residing at Heyworth, in the county of McLean and State of Illinois, have invented certain new and useful Improvements in Corn-Harvesters; and I do declare the following to be a full, clear, and exact description of the invention, such as will enable others skilled in the art to which it appertains to make and use the same.

My invention relates to improvements in corn-harvesting machines of that class in which the ears of corn are stripped from the stalks while the latter are standing in the field, then husked as the machine is moved forwardly, and finally delivered into a suitable receptacle or a wagon which moves along in the field adjacent to the machine.

The object of my invention is to improve and simplify the construction and operation of machines of this character, and thereby render the same more efficient and durable in use and less expensive to manufacture.

With the above and other objects in view the invention consists of certain novel features of construction, combination, and arrangement of parts, as will be hereinafter more fully described, and particularly pointed out in the appended claims.

Figure 1:
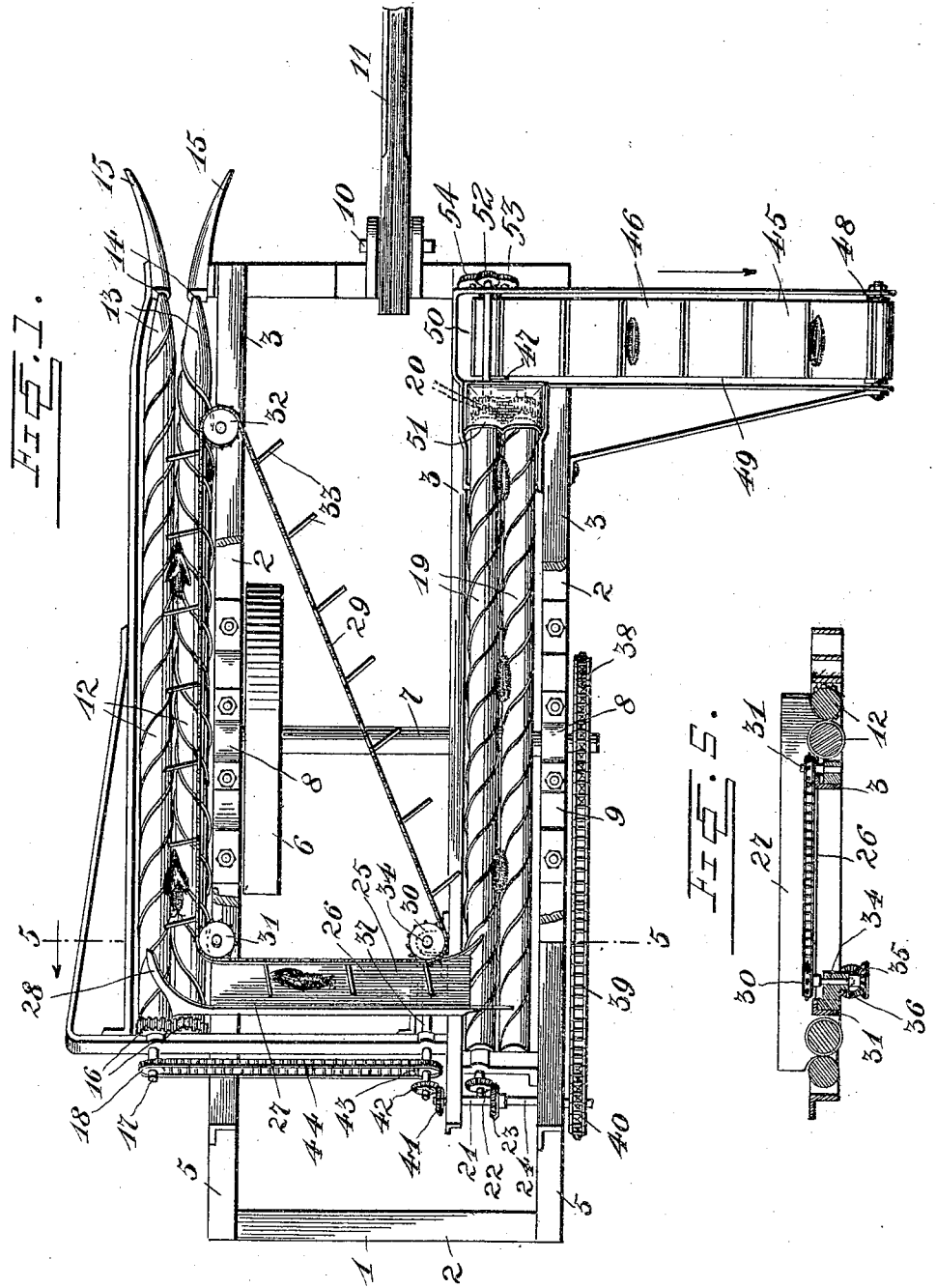
Figure 2:
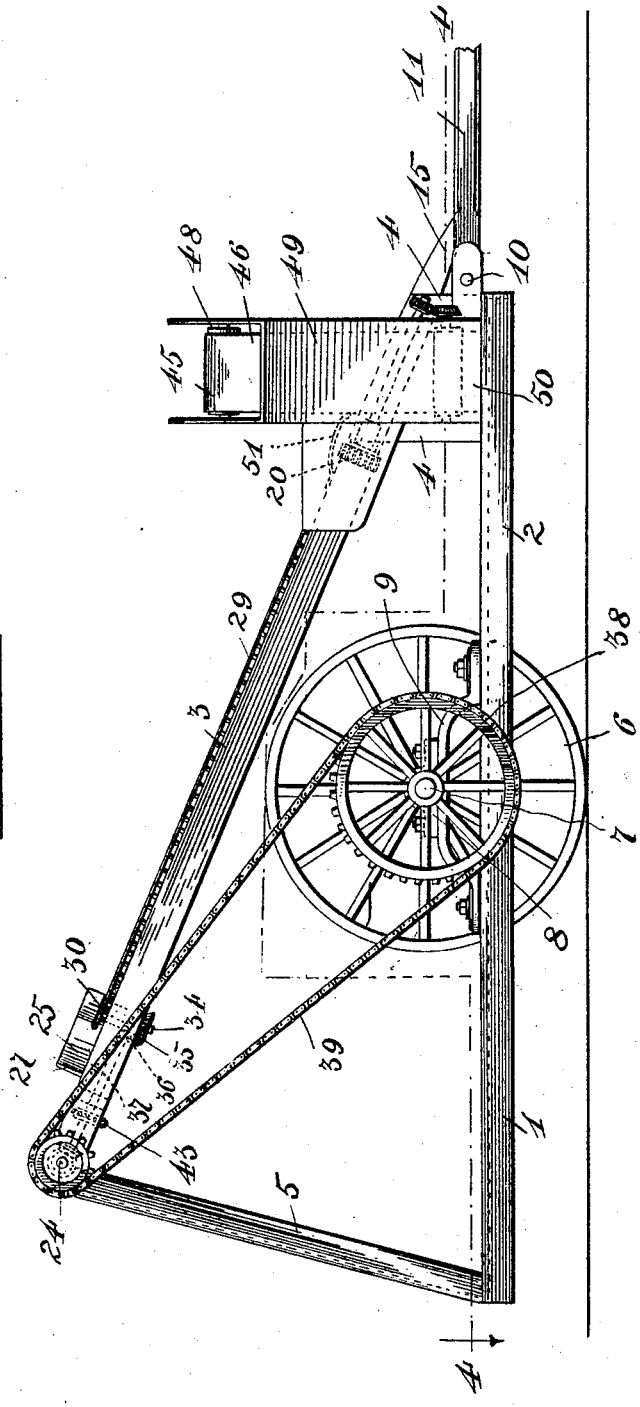
Figure 3:
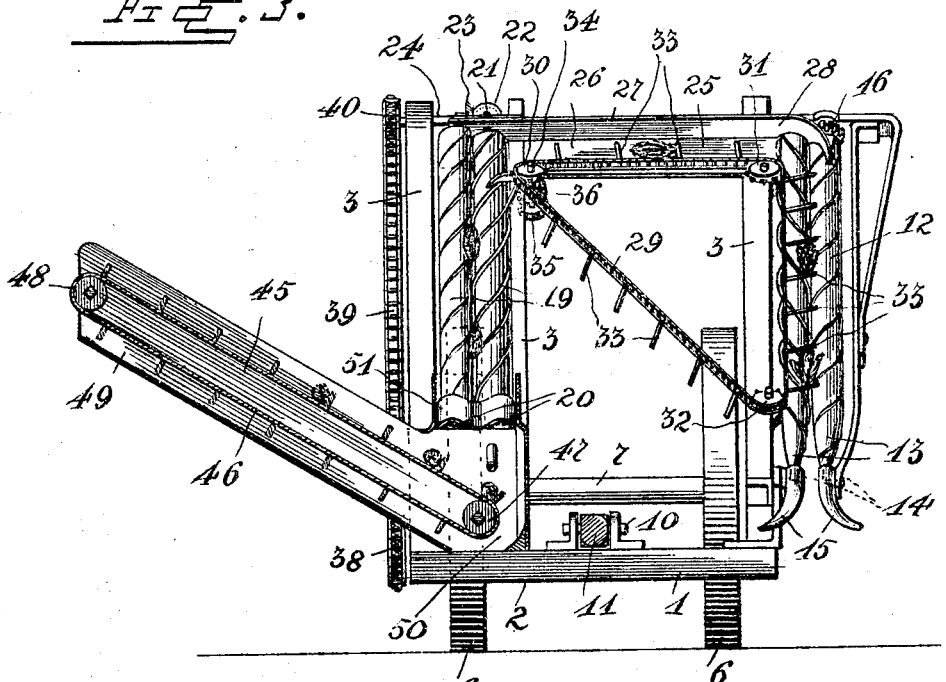
Figure 4:
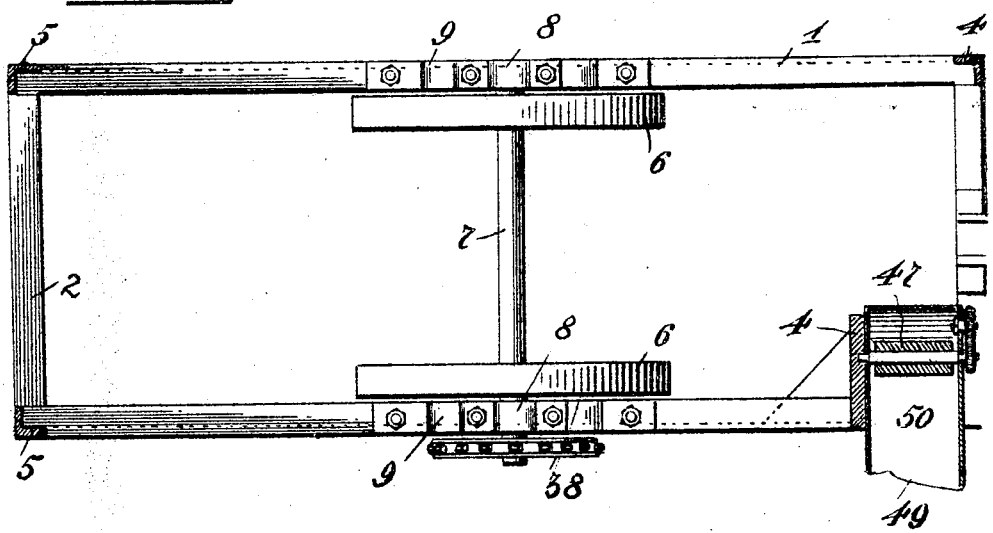

In the accompanying drawings, Figure 1 is a top plan view of a corn-harvesting machine embodying my improvements. Fig. 2 is a side elevation of the same. Fig. 3 is a front end elevation, partly in section. Fig. 4 is a horizontal sectional view taken on the line 4 4 of Fig. 2, and Fig. 5 is a detail vertical transverse sectional view taken on the line 5 5 of Fig. 1.

Referring to the drawings by numerals, 1 denotes the main frame of the machine, which consists of a lower rectangular portion 2 and an upper inclined portion 3, which is supported upon the portion 2 by uprights 4 and 5. This frame is constructed, preferably, of angle iron or steel and is supported upon wheels 6, which are secured to an axle 7, journaled in bearings 8 upon brackets 9, which are bolted or otherwise secured upon the two side beams of the lower portion 2 of the frame. At the front end of the lower portion 2 of the frame is pivotally connected, as at 10, the usual draft tongue or pole 11.

Mounted upon the upper inclined portion 3 of the frame is a pair of stripping or snapping rollers 12, which have their lower tapered ends 13 journaled in suitable bearings 14, provided in outwardly-curved gathering-arms 15, which are secured to the frame of the machine. The upper ends of said rollers 12 are journaled in suitable bearings provided upon the portion 3 of the frame and are connected by meshing pinions or gears 16. The shaft 17 of one of said rollers has secured upon one end a sprocket-wheel 18, by means of which said rollers are driven, as presently explained. Mounted upon the opposite portion 3 of the frame in the same plane as the snapping-rollers 12 are a pair of husking-rollers 19, which extend in the same longitudinal direction as the said rollers 12. The rollers 19 are journaled in suitable bearings upon the portion 3 of the frame and have their lower ends connected by meshing pinions 20. The shaft 21 at the upper end of one of the rollers 19 has secured upon it a bevel-pinion 22, which is in mesh with a pinion or gear 23, secured upon a transversely-disposed shaft 24, journaled in bearings in the portion 3 of the frame. Extending transversely across the upper portion of the part 3 of the frame is a guideway or trough 25, through which the ears of corn are conducted from the snapping or stripping rollers 12 to the husking-rollers 19. This guideway or trough consists of a bottom 26 and an upright guide 27, which has one of its ends curved, as shown at 28, and extending over the upper rear ends of the rollers 12 to direct the ears of corn from said rollers into said trough. In order to cause the ears of corn to be positively fed or moved up the rollers 12 and through the guideway 25, I preferably provide an endless conveyer 29 in the form of a sprocket-chain, which is passed around three sprocket-wheels 30 31 32, disposed in triangular relation. The sprocket-chain 29 is provided at suitable intervals with outwardly-projecting fingers or arms 33, which are adapted to engage the ears of corn, as shown in Fig. 1. The two wheels 30 and 31 are disposed at opposite ends of the guideway 25, the wheel 31 being adjacent to the rollers 12 and the wheel 30 being adjacent to the rollers 19, and the third wheel 32 is disposed adjacent to the lower ends of the rollers 12, as shown. The shafts of the wheels 31 and 32 are suitably journaled in the portion 3 of the frame, and the shaft 34 of the wheel 30 has secured upon its lower end a bevel-gear 35, which meshes with a similar gear 36 upon the forward end of a longitudinally-disposed shaft 37, which is mounted in suitable bearings in said portion 3 of the frame. The snapping-rollers, the husking-rollers, and the endless conveyer 29 are driven from the axle 7 by providing upon the latter a sprocket-wheel 38 and connecting the same by a sprocket-chain 39 to a sprocket-wheel 40, which is secured upon said shaft 24. Upon the inner end of said shaft 24 is a bevel gear or pinion 41, which meshes with a similar gear or pinion 42 upon the outer or rear end of the said shaft 37, and upon the latter is secured a sprocket-wheel 43, which is connected by a chain 44 to the said sprocket-wheel 18. By means of these connections it will be seen that as the machine is moved forwardly the two pairs of rollers and the endless conveyer will be operated.

In order to receive the husked ears of corn at the lower end of the husking-rollers 19 and conduct them into a suitable receptacle or a wagon which is moved along adjacent to the machine, I provide an endless conveyer or elevator 45. This elevator may be of any suitable construction. It is here shown as an endless apron 46, provided with flights and passed over rollers 47 and 48, suitably journaled in a frame or casing 49, which is mounted upon the said frame 1. As clearly shown in Fig. 3 of the drawings, the lower end of said elevator extends into a hopper 50, which is secured beneath the lower ends of the husking-rollers 19 and into which the husked ears of corn are discharged from the said rollers by means of a deflector-plate 51, which is mounted above the gears or pinions 20 at the ends of said rollers. The shaft of one of the rollers 19 has its lower portion prolonged, extended across the frame or casing 49, and provided at its lower end with a gear-wheel 52. The roller 47 of the elevator is provided with a gear-wheel 53. An idler-gear 54, which is suitably mounted, engages the gears 52 53, and hence motion is transmitted from the said husking-roller to the said elevator.

The operation and advantages of the machine will be readily understood from the foregoing description, taken in connection with the accompanying drawings. It will be seen that as the machine is drawn forwardly through a field of corn, so that the outwardly-curved tapered arms 15 will direct the stalks in a row of corn between the snapping or stripping rollers 12, the ears upon said stalks will be snapped from the same by said rollers without pulling the stalks from the ground. The endless conveyer 29 will then carry the stalks upwardly over the rollers 12, through the guideway 25, and onto the upper ends of the husking-rollers 19. The latter will remove all husks from the ears as they move by gravity down said rollers and discharge into the hopper 50, from which the elevator 45 conducts them to a wagon or the like located beneath its upper and outer end, as clearly shown in Fig. 3.

While I have shown and described the preferred embodiment of my invention, it will be understood that various changes in the form, proportion, and the minor details of construction may be resorted to without departing from the principle or sacrificing any of the advantages of this invention.

Having thus described my invention, what I claim as new, and desire to secure by Letters Patent, is

1. In a corn-harvester, the combination with longitudinally-disposed snapping-rolls and husking-rolls, of a transversely-extending guide between said rolls, and an endless conveyer for positively feeding ears of corn along said snapping-rolls and through said guide, substantially as described.

2. In a corn-harvester, the combination of a wheeled frame, a pair of snapping-rolls mounted thereon, a pair of husking-rolls mounted longitudinally upon said frame to one side of said snapping-rolls, a guideway upon said frame between said pairs of rolls, a fingered endless conveyer mounted upon said frame to travel along said snapping-rolls and said guideway, and means for simultaneously operating said rolls and said conveyer, substantially as described.

3. In a corn-harvester, the combination with a wheeled frame, a pair of snapping-rolls mounted thereon, a pair of husking-rolls mounted upon said frame to one side of the said snapping-rolls, a guideway upon said frame between the adjacent inner ends of said pairs of rolls, an endless conveyer mounted upon said frame to travel along said snapping-rolls and said guideway, a hopper at the lower end of said husking-rolls, a deflector-plate for directing the ears of corn from said husking-rolls into said hopper, and an endless conveyer for conducting the ears of corn from said hopper to a suitable receptacle, substantially as described.

In testimony whereof I have hereunto set my hand in presence of two subscribing witnesses.

FRED. J. COOK.

Witnesses:
   CHAS. SCHOEFFEL,
   J. P. SHELTON.